(12) United States Patent
Howcroft et al.

(10) Patent No.: US 9,628,786 B2
(45) Date of Patent: Apr. 18, 2017

(54) SYSTEM AND METHOD OF INDICATING VIDEO CONTENT QUALITY

(75) Inventors: Jerald Robert Howcroft, Beverly Hills, MI (US); Zhi Li, San Ramon, CA (US); John McClenny, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1320 days.

(21) Appl. No.: 11/804,573

(22) Filed: May 18, 2007

(65) Prior Publication Data

US 2008/0288977 A1    Nov. 20, 2008

(51) Int. Cl.
*H04N 7/173* (2011.01)
*H04N 17/00* (2006.01)
*H04N 21/43* (2011.01)
*H04N 21/431* (2011.01)
*H04N 21/4425* (2011.01)
*H04N 21/643* (2011.01)

(52) U.S. Cl.
CPC ......... *H04N 17/00* (2013.01); *H04N 21/4307* (2013.01); *H04N 21/4316* (2013.01); *H04N 21/4425* (2013.01); *H04N 21/64322* (2013.01)

(58) Field of Classification Search
None
See application file for complete search history.

(56) References Cited

U.S. PATENT DOCUMENTS

| 6,671,724 | B1 * | 12/2003 | Pandya et al. | 709/226 |
|---|---|---|---|---|
| 7,010,598 | B2 * | 3/2006 | Sitaraman et al. | 709/224 |
| 2001/0011375 | A1 | 8/2001 | Yun | |
| 2003/0004680 | A1 | 1/2003 | Dara-Abrams et al. | |
| 2004/0054771 | A1 * | 3/2004 | Roe et al. | 709/224 |
| 2005/0044563 | A1 * | 2/2005 | Yun | 725/107 |
| 2005/0102569 | A1 * | 5/2005 | Wu et al. | 714/25 |
| 2005/0114879 | A1 * | 5/2005 | Kamieniecki | 725/15 |
| 2005/0149964 | A1 * | 7/2005 | Thomas et al. | 725/9 |
| 2005/0183130 | A1 * | 8/2005 | Sadja et al. | 725/107 |
| 2006/0010470 | A1 * | 1/2006 | Kurosaki et al. | 725/29 |
| 2006/0190594 | A1 * | 8/2006 | Jorgenson | H04L 12/2697 709/224 |
| 2007/0033446 | A1 * | 2/2007 | Tinkler et al. | 714/47 |
| 2007/0041554 | A1 | 2/2007 | Newman et al. | |
| 2007/0047542 | A1 * | 3/2007 | Thukral | 370/389 |
| 2007/0113246 | A1 * | 5/2007 | Xiong | 725/39 |
| 2007/0136753 | A1 * | 6/2007 | Bovenschulte et al. | 725/46 |

(Continued)

*Primary Examiner* — Brian T Pendleton
*Assistant Examiner* — Dika C. Okeke
(74) *Attorney, Agent, or Firm* — Toler Law Group, PC (57) ABSTRACT

A method of indicating video content quality is disclosed that includes receiving performance data at a video content quality server from a set-top box device. The performance data may include values of a plurality of video content quality parameters. The method also includes generating a graphical user interface indicating a quality of video content received at the set-top box device. The graphical user interface may include the values of each of the plurality of video content quality parameters. Further, the method includes sending data corresponding to the graphical user interface from the video content quality server to the set-top box device. The method may include the video content quality server receiving a request from the set-top box device to send the data corresponding to the graphical user interface.

28 Claims, 7 Drawing Sheets

(56) References Cited

U.S. PATENT DOCUMENTS

| | | | |
|---|---|---|---|
| 2007/0157260 A1* | 7/2007 | Walker | 725/86 |
| 2008/0066113 A1* | 3/2008 | Skelly | H04N 17/004 725/58 |
| 2010/0095337 A1* | 4/2010 | Dua | 725/110 |
| 2015/0341812 A1* | 11/2015 | Dion | H04W 24/08 370/252 |

* cited by examiner

SYSTEM AND METHOD OF INDICATING VIDEO CONTENT QUALITY

FIELD OF THE DISCLOSURE

The present disclosure is generally related to systems and methods of indicating video content quality.

BACKGROUND

Television viewing is a part of daily life for many people. The quality of a viewer's experience often depends on the quality of video content being viewed. When video content quality degrades, the video content provider may send a technician to the viewer's home in order to identify and repair a cause of the video quality degradation. However, subscribers and technicians may have to guess at such causes due to a lack of information regarding video quality at a specific premise or subscriber device. Hence, there is a need for an improved system and method of indicating video content quality.

DETAILED DESCRIPTION OF THE DRAWINGS

A system to indicate video content quality is disclosed that includes a processor and a memory accessible to the processor. The memory includes a performance data module executable by the processor to receive performance data from a set-top box device, where the performance data includes values of a plurality of video content quality parameters. The memory also includes a graphical user interface module executable by the processor to generate a graphical user interface indicating a quality of video content received at the set-top box device. The graphical user interface includes the values of each of the plurality of video content quality parameters. Further, the memory includes a graphical user interface data module executable by the processor to send data corresponding to the graphical user interface to the set-top box device. The graphical user interface data module may be executable by the processor to send the data corresponding to the graphical user interface in response to receiving a request from the set-top box device to send the data corresponding to the graphical user interface.

In another embodiment, a set-top box device is disclosed that includes a processor and a memory accessible to the processor. The memory includes a performance data collection module executable by the processor to collect performance data related to the set-top box device. The performance data includes values of a plurality of Internet Protocol Television (IPTV) video content quality parameters. The memory also includes a performance data control module executable by the processor to send the performance data to a video content quality server. Further, the memory includes a graphical user interface module executable by the processor to receive data corresponding to a graphical user interface from the video content quality server. The graphical user interface module may be executable by the processor to send a request to the video content quality server to send the data corresponding to the graphical user interface to the set-top box device. The graphical user interface module is also executable by the processor to provide the graphical user interface to a display device coupled to the set-top box device. The graphical user interface indicates a quality of video content received at the set-top box device and the graphical user interface also includes the values of each of the plurality of IPTV video content quality parameters. The set-top box device also includes a performance data store.

In another embodiment, a method of indicating video content quality is disclosed that includes receiving performance data at a video content quality server from a set-top box device, where the performance data includes values of a plurality of video content quality parameters. The method also includes generating a graphical user interface indicating a quality of video content received at the set-top box device. The graphical user interface includes the values of each of the plurality of video content quality parameters. Further, the method includes sending data corresponding to the graphical user interface from the video content quality server to the set-top box device. The method may include receiving a request from the set-top box device to send the data corresponding to the graphical user interface.

In another embodiment, a method of indicating video content quality is disclosed that includes collecting first performance data at a set-top box device during a first period of time, where the first performance data indicates a plurality of measurement values related to a plurality of Internet Protocol Television (IPTV) video content quality parameters. The method also includes sending the first performance data to a video content quality server and receiving data corresponding to a graphical user interface from the video content quality server. The method may include sending a request from the set-top box device to the video content quality server to send the data corresponding to the graphical user interface to the set-top box device. The graphical user interface indicates a quality of video content received at the set-top box device. Further, the method also includes providing the graphical user interface to a display device coupled to the set-top box device.

In another embodiment, a computer-readable medium is disclosed having instructions to cause a processor to execute a method that includes receiving performance data at a video content quality server from a set-top box device, where the performance data includes values of a plurality of video content quality parameters. The computer-readable medium also includes instructions to cause a processor to execute a method that includes generating a graphical user interface indicating a quality of video content received at the set-top box device. The graphical user interface includes the values of each of the plurality of video content quality parameters. Further, the computer-readable medium includes instructions to cause a processor to execute a method that includes sending data corresponding to the graphical user interface from the video content quality server to the set-top box device. The computer-readable medium may include instructions to cause a processor to execute a method comprising receiving a request from the set-top box device to send the data corresponding to the graphical user interface.

Figure 1:
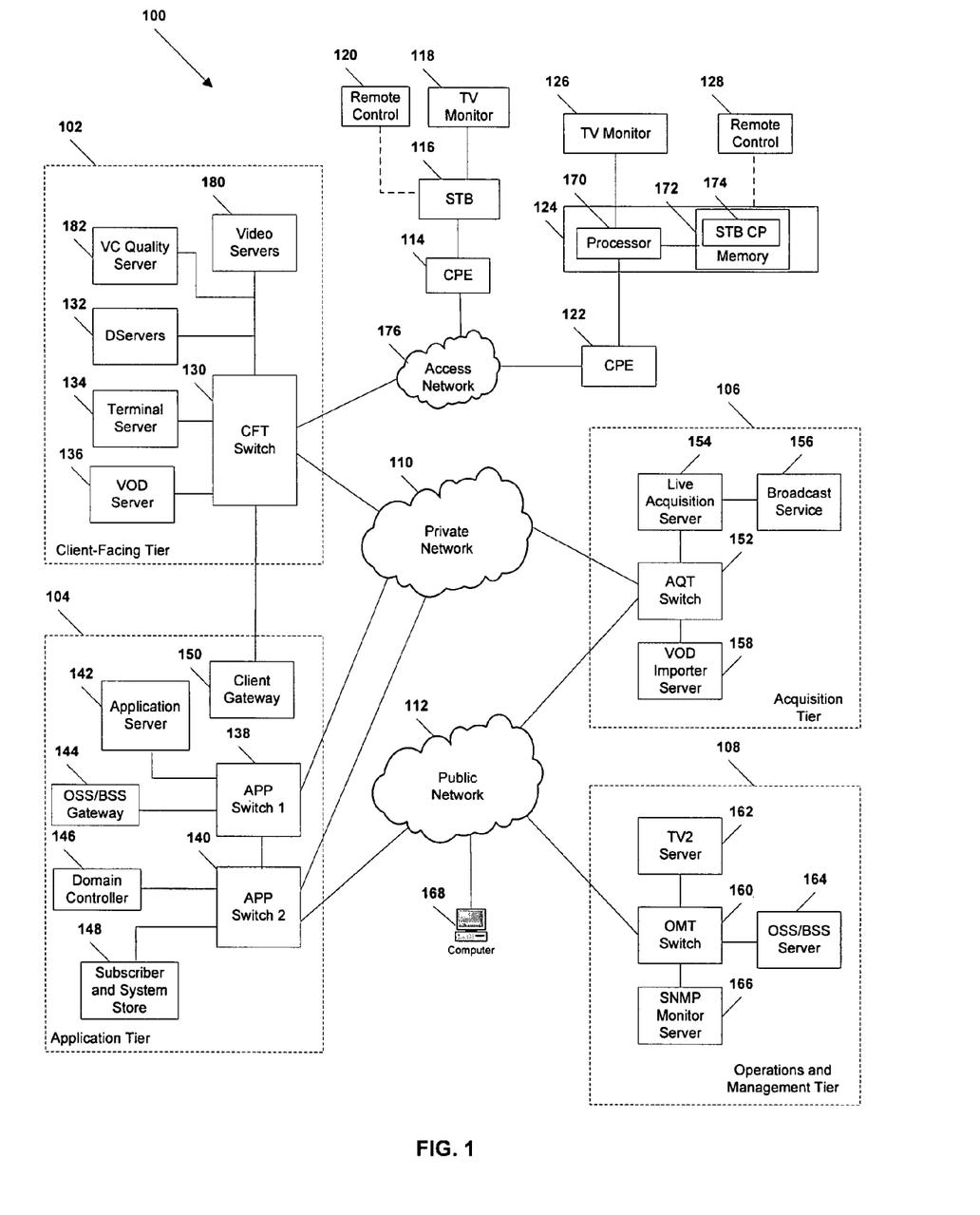
FIG. 1 is a block diagram illustrating an embodiment of a system to indicate video content quality.

Referring to FIG. 1, an illustrative embodiment of an Internet Protocol Television (IPTV) system that may be used to indicate video content quality is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 176, such as an Internet Protocol Television (IPTV) access network. In an illustrative embodiment, customer premises equipment (CPE) 114, 122 can be coupled to a local switch, router, or other device of the access network 176. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 176, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 176, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 176 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 176 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a point of connection to the IPTV system 100 via the client-facing tier 102. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that receive video content and transmit the content to the set-top boxes 116, 124 via the access network 176. In addition, the CFT switch can be coupled to a video content quality server, such as the VC quality server 182, that produces a graphical user interface indicating the quality of video content received at the set-top box devices 116, 124.

In an illustrative embodiment, the client-facing tier 102 can communicate with a large number of set-top boxes, such as the representative set-top boxes 116, 124, over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. In another illustrative embodiment, the subscriber and system store can store data associated with capabilities of set-top box devices associated with particular customers.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 176, using information received from the client gateway 150. User devices can access the client gateway 150 via the access network 176, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 176.

For example, when the first representative set-top box device 116 accesses the client-facing tier 102 via the access network 176, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 176.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 176. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 176 to the VOD server 136, via the CFT switch 130. Upon receiving such requests, the VOD server 136 can retrieve the requested VOD content and transmit the content to the set-top box devices 116,124 across the access network 176, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 166 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular embodiment, the VC quality server 182 can retrieve performance data from the set-top box device 124. The VC quality server 182 may also receive performance data from a network element management system communicating with the set-top box device 124. The network element management system may collect performance data from a number of elements included in the IPTV system 100. The VC quality server 182 determines a quality of video content received at the set-top box device 124 based on the performance data. In an illustrative, non-limiting embodiment, the video content quality may be automatically determined after a configurable period of time, such as every hour or every 24 hours. The video content quality may also be determined on demand in response to a request from a video content provider representative or from a subscriber associated with the set-top box device 124. In another illustrative, non-limiting embodiment, the video content quality may be determined at intervals determined based on a video content quality history. For example, during periods of degraded video content quality, the video content quality determination may occur more frequently.

The performance data may include values of a plurality of video content quality parameters. For example, the plurality of video content quality parameters may include Internet Protocol Television (IPTV) parameters, such as reliable user datagram protocol (RUDP) successful retransmissions, RUDP un-successful retransmissions, packet loss, buffer not retried counter, buffer large holes counter, packets in, number of holes during a time interval, average hole size during the time interval, largest hole size during the time interval, decoder buffer underflow events, decoder re-buffering events, number of I-frames lost, I-frame decoding errors, moving picture experts group (MPEG) stream discontinuity count, or any combination thereof.

In a particular illustrative embodiment, video content can be displayed at a TV monitor, such as the TV monitor 126, via a set-top box device, such as the second representative set-top box device 124. The set-top box device 124 may receive a selection to view values of video content quality parameters related to video content received at the set-top box device 124. For example, a subscriber may want to examine the video content quality parameters because of degradation in the quality of the video content shown at the TV monitor 126, such as an interruption in the video content transmission or distorted video content images. In an illustrative, non-limiting embodiment, the selection can be received from a remote control 128. Alternatively, the subscriber may utilize a keyboard, mouse, or some other input device to enter the selection. In response to a selection to view the values of the video content quality parameters, the set-top box device 124 can send a request to the VC quality server 182 for a graphical user interface that includes the values of the video content quality parameters.

In a particular embodiment, the VC quality server 182 generates a graphical user interface indicating a quality of video content received at the set-top box device 124. In an illustrative embodiment, the graphical user interface may include the values of each of the plurality of video content quality parameters included in the performance data. In another illustrative embodiment, the graphical user interface may include a specified group of video content quality parameters. For example, the graphical user interface may include the video content quality parameters with values that are outside of a specified range. Additionally, the graphical user interface may include a default group of video content quality parameters, such as RUDP successful retransmissions, RUDP un-successful retransmissions, and packet loss, during periods of normal video content quality. In a further illustrative embodiment, the graphical user interface may include a specific video content quality indicator, such as a pop-up window or display icon, representing a measure of video content quality. For example, the measure of video content quality could be high, medium, low or good, fair, poor.

In a particular embodiment, the VC quality server 182 may send data corresponding to the graphical user interface to the set-top box device 124. Upon receiving the graphical user interface data, the set-top box device 124 may provide the graphical user interface to the TV monitor 126.

In a particular embodiment, the VC quality server 182 may send data corresponding to the graphical user interface to a processor coupled to a display device in a location that is remote from the location of the set-top box device 124. For example, the VC quality server 182 may send the graphical user interface data to a computer and monitor utilized by a video content provider representative. The video content provider representative, such as a customer service representative or technician, may analyze the values of the video content quality parameters to determine the cause of the video content quality degradation, such as packet loss, buffer underflow, or decoding errors. In an illustrative, non-limiting embodiment, the video content quality server 182 may send the graphical user interface data to a plurality of locations that are remote from the set-top box device 124, such as a computer associated with a technician, a central office, a network operator station, a customer service call center, other locations, or any combination thereof.

In an illustrative embodiment, configuration data associated with the set-top box device 124 may be accessible via the graphical user interface. The configuration data may indicate operational settings of one or more software modules executable by a processor of the set-top box device 124; operational settings of one or more hardware devices controlled by the processor of the set-top box device 124, such as video content buffer size or memory allocation; or any combination thereof. In an illustrative, non-limiting embodiment, a subscriber or a video content provider representative may alter the configuration of the set-top box device 124 based on recommendations received via the graphical user interface.

Figure 2:
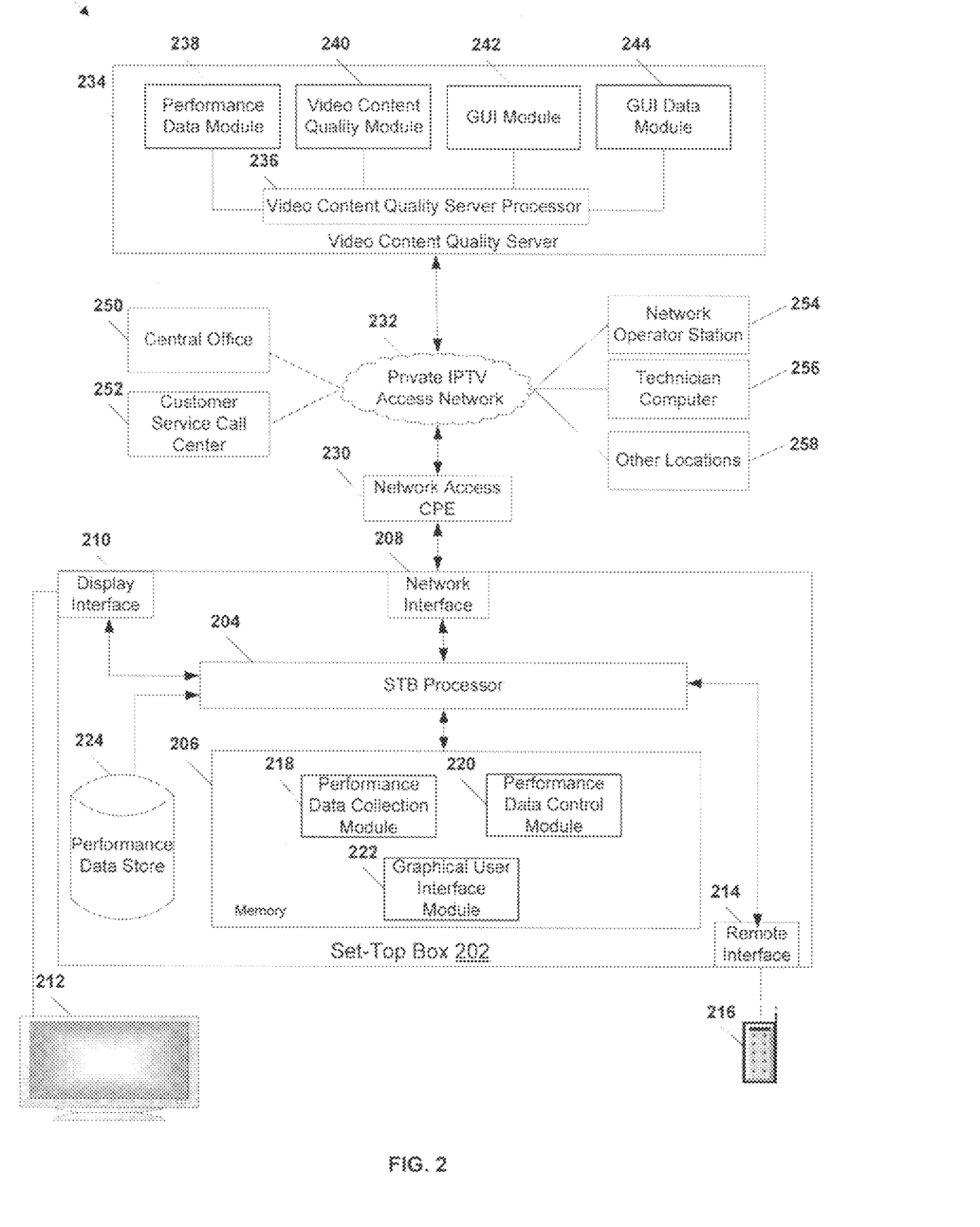
FIG. 2 is a block diagram illustrating a second particular illustrative embodiment of a system to indicate video content quality.

FIG. 2 is a block diagram of a second particular illustrative embodiment of a system 200 to indicate video content quality. The system 200 includes a set-top box device 202 that communicates with a video content quality server 234 via a private Internet Protocol Television (IPTV) access network 232. The set-top box device 202 includes a STB processor 204 and a memory 206 accessible to the STB processor 204. The STB processor can communicate video content to a display device 212 via a display interface 210.

In addition, the STB processor 204 may communicate with a remote control device 216 via a remote interface 214.

In a particular embodiment, the STB processor 204 may communicate with the private IPTV access network 232 via a network interface 208. In an illustrative, non-limiting embodiment, a network access customer premises equipment (CPE) 230 may facilitate communication between the network interface 208 and the private IPTV access network 232. The network access CPE 230 may include a router, a local area network device, a modem, such as a digital subscriber line (DSL) modem, a residential gateway, any other suitable device for facilitating communication between the network interface 208 of the set-top box device 202 and the private IPTV access network 232, or any combination thereof.

In a particular embodiment, the memory 206 may include a performance data collection module 218 that is executable by the STB processor 204 to collect performance data related to the set-top box device 202. The performance data includes values of a plurality of IPTV video content quality parameters. The IPTV video content quality parameters may include reliable user datagram protocol (RUDP) successful retransmissions, RUDP un-successful retransmissions, packet loss, buffer not retried counter, buffer large holes counter, packets in, number of holes during a time interval, average hole size during the time interval, largest hole size during the time interval, decoder buffer underflow events, decoder re-buffering events, number of I-frames lost, I-frame decoding errors, moving picture experts group (MPEG) stream discontinuity count, or any combination thereof.

In an illustrative embodiment, the performance data collection module 218 may be executable by the STB processor 204 to collect first performance data during a first period of time and second performance data during a second period of time. In an illustrative, non-limiting embodiment, an amount of time associated with the second period of time may be altered based on the first performance data. For example, the performance data collection module 218 may be executable by the STB processor 204 to collect performance data for longer or shorter periods of time when the values of the IPTV video content quality parameters are within certain parameters. If the previously stored values of the IPTV video content quality parameters are within a particular range, then the performance data collection module 218 may be executable by the STB processor 204 to collect the performance data for the first period of time, but if the values of the IPTV video content quality parameters fall outside of a specified range, then the performance data collection module 218 may be executable by the STB processor 204 to store the performance data for another period of time, which may be longer than the first period of time.

In a particular embodiment, the memory 206 may include a performance data control module 220 executable by the STB processor 204 to store the performance data collected at the set-top box device 202 in a database, such as the performance data store 224. In an illustrative embodiment, the performance data control module 220 may be executable by the STB processor to store the first performance data in the performance data store 224 during the first period and to store the second performance data in the performance data store 224 during the second period of time. In an illustrative, non-limiting embodiment, the performance data control module 220 may be executable by the STB processor 204 to store both the first performance data and the second performance data at the performance data store 224 during the second period of time. In a further illustrative embodiment, the performance data control module 220 may be executable by the STB processor 204 to delete the first performance data from the performance data store 224 in response to storing the second performance data in the performance data store 224.

In a particular embodiment, the performance data control module 220 is executable by the STB processor 204 to send the performance data to the video content quality server 234 or to a remote data storage device. In an illustrative embodiment, the performance data control module may be executable by the STB processor 204 to send the performance data to the video content quality server 234 or to the remote storage device at regular intervals or in response to a command received from a subscriber associated with the set-top box device 202 or from a video content provider representative. In an illustrative, non-limiting embodiment, the performance data control module 220 may be executable by the STB processor 204 to send first performance data collected during a first period of time to the video content quality server 234 or to the remote data storage device in response to storing second performance data collected during a second period of time at the performance data store 224. The performance data control module 220 may also be executable by the STB processor 204 to delete the first performance data from the performance data store 224 in response to sending the first performance data to the video content quality server 234 or to the remote data storage device.

In a particular embodiment, the memory 206 may include a graphical user interface module 222 executable by the STB processor 204 to receive a selection to view a graphical user interface that indicates a quality of video content received at the set-top box device 202. For example, a selection to view the graphical user interface may be received from an input device, such as the remote control device 216. The graphical user interface module 222 is also executable by the STB processor 204 to send a request for the graphical user interface to the video content quality server 234. In an illustrative, non-limiting embodiment, the graphical user interface may indicate a quality of video content received at the set-top box device 202 by showing values of a plurality of IPTV video content quality parameters. For example, the graphical user interface may include values of all of the IPTV video content quality parameters included in the performance data collected by the set-top box device 202.

In a particular embodiment, the graphical user interface module 222 is executable to receive data corresponding to the graphical user interface from the video content quality server 234. The graphical user interface module 222 may also be executable by the STB processor 204 to provide the graphical user interface to the display device 212 coupled to the set-top box device 202.

In an illustrative embodiment, first display characteristics may be accessible via the graphical user interface. For example, the first display characteristics may include a selectable customer service request icon, a set-top box device configuration data icon, or any combination thereof. In an illustrative, non-limiting embodiment, the first display characteristics may be accessible to a subscriber associated with the set-top box device 202. For example, a subscriber associated with set-top box device 202 may access the graphical user interface having first display characteristics via an input device, such as the remote control device 216.

In an illustrative embodiment, second display characteristics may be accessible via the graphical user interface. For example, the second display characteristics may include real-time performance data, historical performance data, a plurality of adjustable configuration settings related to the set-top box device 202, or any combination thereof. In an illustrative, non-limiting embodiment, the second display characteristics may be accessible to a video content provider representative after providing a login identification via an input device, such as the remote control 216.

In an illustrative, non-limiting embodiment, the first display characteristics of the graphical user interface may include values of IPTV video content quality parameters collected during a first period of time and the second display characteristics of the graphical user interface may include values of IPTV video content quality parameters collected during a second period of time.

In a particular embodiment, the video content quality server 234 can include a video content quality server processor 236. In addition, the video content quality server 234 may include a performance data module 238 that is executable by the video content quality server processor 236 to receive performance data from a set-top box device, such as the set-top box device 202. The performance data includes values of a plurality of video content quality parameters. In an illustrative embodiment, the performance data module 238 may receive at least a portion of the performance data from a network element management system communicating with set-top box device 202.

In an illustrative embodiment, the performance data module 238 may be executable by the video content quality server processor 236 to store the performance data at a memory device associated with the video content quality server 234. In an illustrative embodiment, the performance data module 238 may be executable by the video content quality server processor 236 to store first performance data during a first period of time and to store second performance data during a second period of time. In an illustrative, non-limiting embodiment, the performance data module 238 may be executable by the video content quality server processor 236 to delete the first performance data in response to storing the second performance data. In an illustrative embodiment, the video content quality server 234 may communicate with a performance data storage device to store the performance data.

In a particular embodiment, the video content quality server 234 may include a video content quality module 240 that is executable by the video content quality server processor 236 to determine a quality of video content received at the set-top box device 202 based on the performance data. For example, the video content quality module 240 may be executable by the video content quality server processor 236 to determine the video content quality by comparing the real-time or historical values of the video content quality parameters with specified value ranges or with particular metrics associated with each of the video content quality parameters. In an illustrative, non-limiting embodiment, only certain default video content quality parameters may be used in making a video content quality determination, such as reliable user datagram protocol (RUDP) successful retransmissions, RUDP un-successful retransmissions, and packet loss. Other video content quality parameters may be used in making the video content quality determination if the default parameters indicate a problem with the video content quality.

In a particular embodiment, the video content quality server 234 may also include a graphical user interface (GUI) module 242 that is executable by the video content quality server processor 236 to generate a graphical user interface indicating a quality of video content received at the set-top box device 202. The graphical user interface may include values of each of a plurality of video content quality parameters included in the performance data.

In an illustrative embodiment, the graphical user interface module 242 may be executable by the video content quality server processor 236 to produce a first graphical user interface including first display characteristics and a second graphical user interface including second display characteristics. For example, the first graphical user interface may include average values of video content quality parameters related to performance data collected during a first period of time and the second graphical user interface may include average values of video content quality parameters related to performance data collected during a second period of time.

In an illustrative, non-limiting embodiment, the order in which the plurality of video content quality parameters are presented in the first graphical user interface and the second graphical user interface may differ based on the video content quality determined for the first period of time and for the second period of time. For example, the plurality of video content quality parameters may be presented in the first graphical user interface in a standard order because the video content quality was normal during the first time period, but if a degradation in video content quality occurs, the video content quality parameters may be presented in an order that first shows the video content quality parameters with measurement values that are outside of a specified range. In addition, the graphical user interface may highlight at least one of the video content quality parameters having a value outside of a specified range. For example, the values associated with the abnormal video content quality parameters may appear in windows included in the graphical user interface having a different color background than the windows associated with the normal video content quality parameters.

In a particular embodiment, the video content quality server 234 includes a graphical user interface data module 244 that is executable by the video content quality server processor 236 to receive a request from the set-top box device 202 to send data corresponding to a graphical user interface indicating a quality of video content received at the set-top box device 202. The graphical user interface data module 244 is executable by the video content quality server processor 236 to send the data corresponding to a graphical user interface to the set-top box device 202 in response to receiving the request. In an illustrative embodiment, the graphical user interface data module 244 may be executable by the video content quality server processor 236 to send data corresponding to a graphical user interface to a location remote from the location of the set-top box device 202. For example, the graphical user interface data may be sent to a central office 250, a customer service call center 252, a network operator station 254, a video content provider technician computer 256, other locations 258, or any combination thereof via the private IPTV access network 232.

In an illustrative, non-limiting embodiment, the graphical user interface data module 244 may be executable by the video content quality server processor 236 to send data corresponding to a first graphical user interface including first display characteristics to the set-top box device 202 and to send data corresponding to a second graphical user interface including second display characteristics to a video content provider representative at a remote location. The first display characteristics may include general system information related to the set-top box device 202, a visual indicator of video content quality, such as high, medium, or low, and a customer service request icon. The second display characteristics may only be accessible to the video content provider representative and include detailed real-time or historical performance data and adjustable configuration settings of the set-top box device 202. In a further illustrative, non-limiting embodiment, the graphical user interface data module 244 may be executable by the video content quality server processor 236 to send data corresponding to both the first graphical user interface and the second graphical user interface to the set-top box device 202.

For ease of explanation, the various modules have been described in terms of processor-executable instructions. However, those skilled in the art will appreciate that such modules can be implemented as hardware logic, processor-executable instructions, or any combination thereof.

Figure 3:
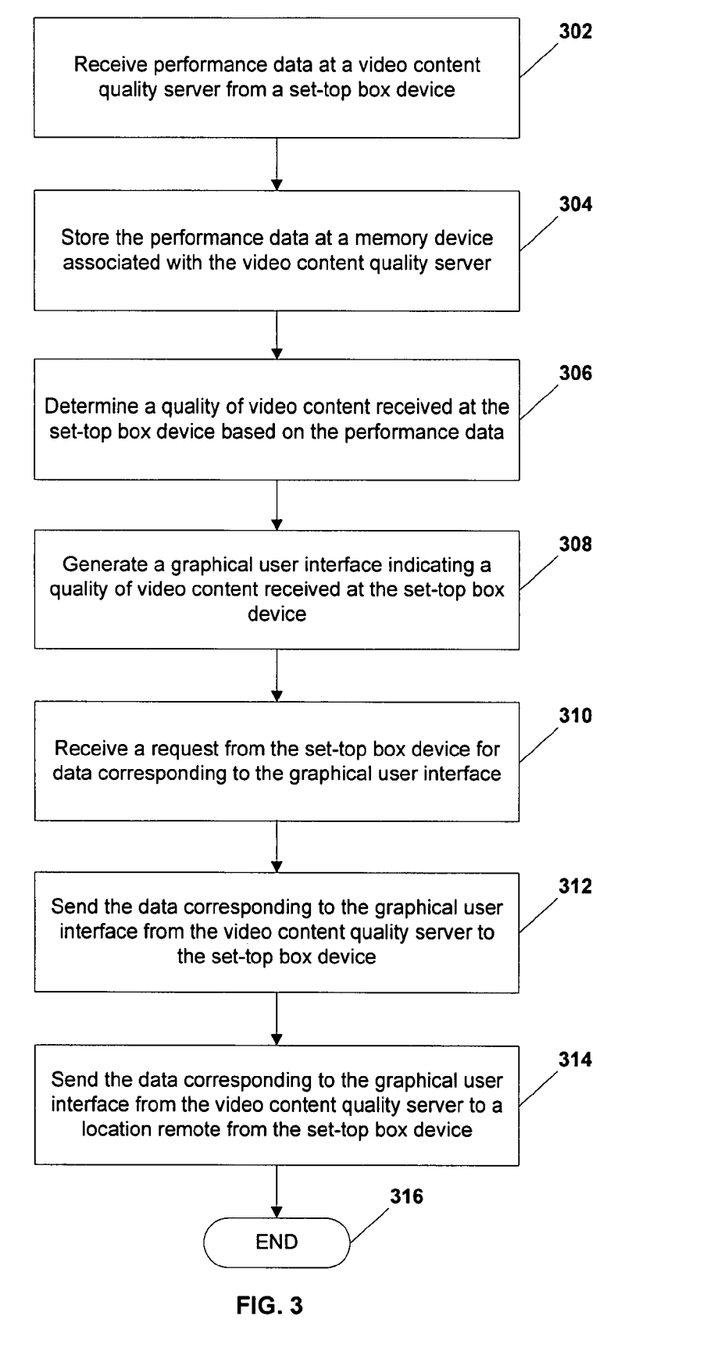
FIG. 3 is a flow diagram of a particular illustrative embodiment of a method of indicating video content quality.

FIG. 3 is a flow diagram of a particular illustrative embodiment of a method of indicating video content quality. At block 302, a video content quality server receives performance data from a set-top box device. The performance data may include a plurality of Internet Protocol Television (IPTV) video content quality parameters. Moving to block 304, the performance data is stored at a memory device associated with the video content quality server.

Proceeding to block 306, the video content quality server determines a quality of video content received at the set-top box device based on the performance data. At block 308, the video content quality server generates a graphical user interface indicating the quality of video content received at the set-top box device. The graphical user interface may include values of each of the IPTV video content quality parameters.

Proceeding to block 310, the video content quality server receives a request from the set-top box device for data corresponding to the graphical user interface. Moving to block 312, the video content quality server sends the data corresponding to the graphical user interface to the set-top box device. At block 314, the video content quality server sends the data corresponding to the graphical user interface to a location remote from the set-top box device. The remote location may include the location of a video content service provider representative involved in solving video content quality problems, such as a customer service representative or a technician. The method terminates at 316.

Figure 4:
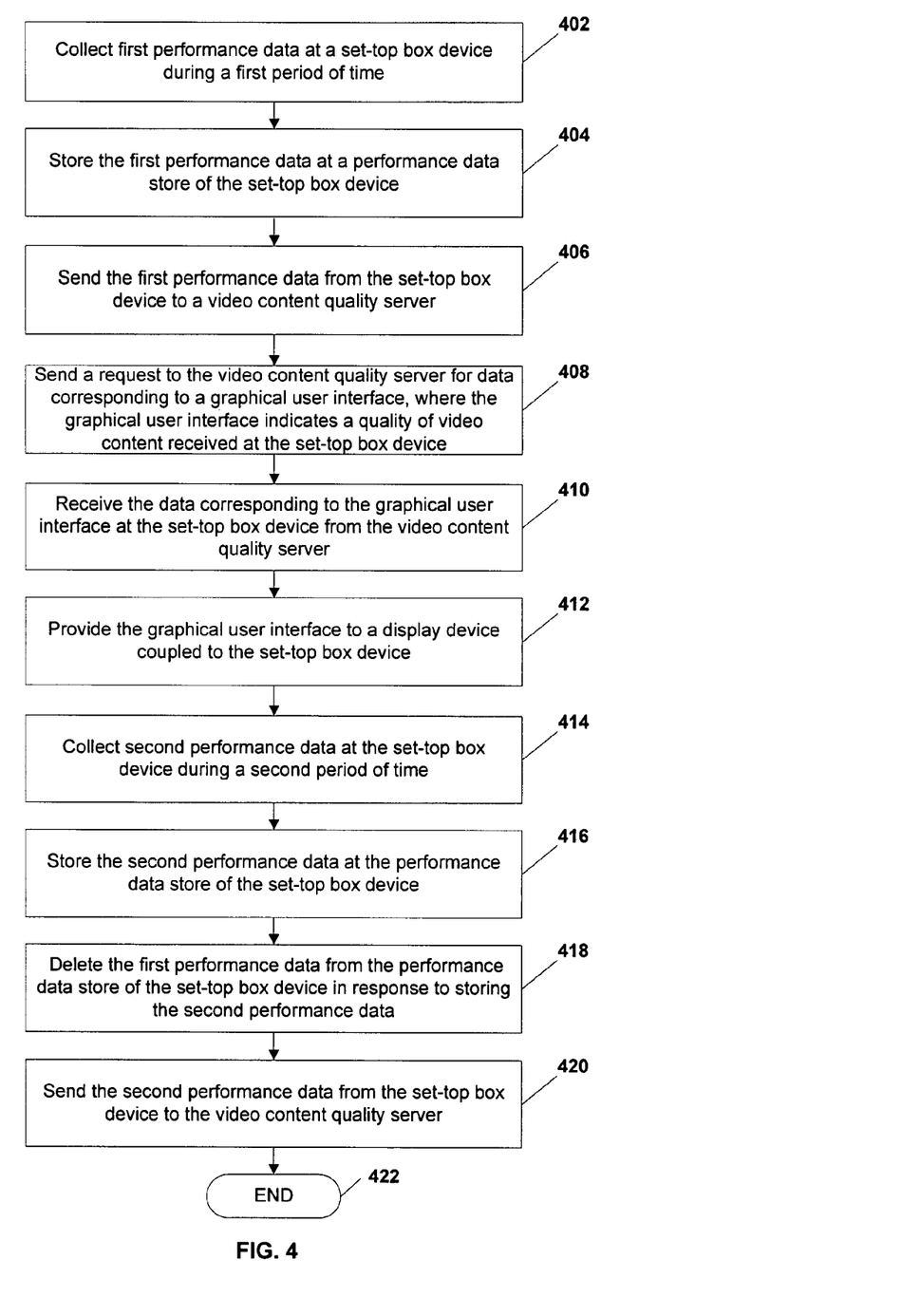
FIG. 4 is a flow diagram of a second particular illustrative embodiment of a method of indicating video content quality.

FIG. 4 is a flow diagram of a second particular illustrative embodiment of a method of indicating video content quality. At block 402, first performance data is collected at a set-top box device during a first period of time. Moving to block 404, the first performance data is stored at a performance data store of the set-top box device. Proceeding to block 406, the first performance data is sent from the set-top box device to a video content quality server.

At block 408, the set-top box device sends a request to the video content quality server for data corresponding to a graphical user interface. For example, the request may be sent to the video content quality server in response to receiving a selection to view the graphical user interface from a user. The graphical user interface may indicate a quality of video content received at the set-top box device. The quality of video content may be based on the first performance data. Moving to block 410, the set-top box device receives the data corresponding to the graphical user interface from the video content quality server. Proceeding to block 412, the graphical user interface is provided to a display device coupled to the set-top box device.

At block 414, second performance data is collected at the set-top box device during a second period of time. The second period of time may have a duration that is the same as the first period of time or different from the first period of time. Moving to block 416, the second performance data is stored at the performance data store of the set-top box device. Proceeding to block 418, the first performance data is deleted from the performance data store of the set-top box device in response to storing the second performance data at the performance data store. At block 420, the second performance data is sent from the set-top box device to the video content quality server. The method terminates at 422.

Figure 5:
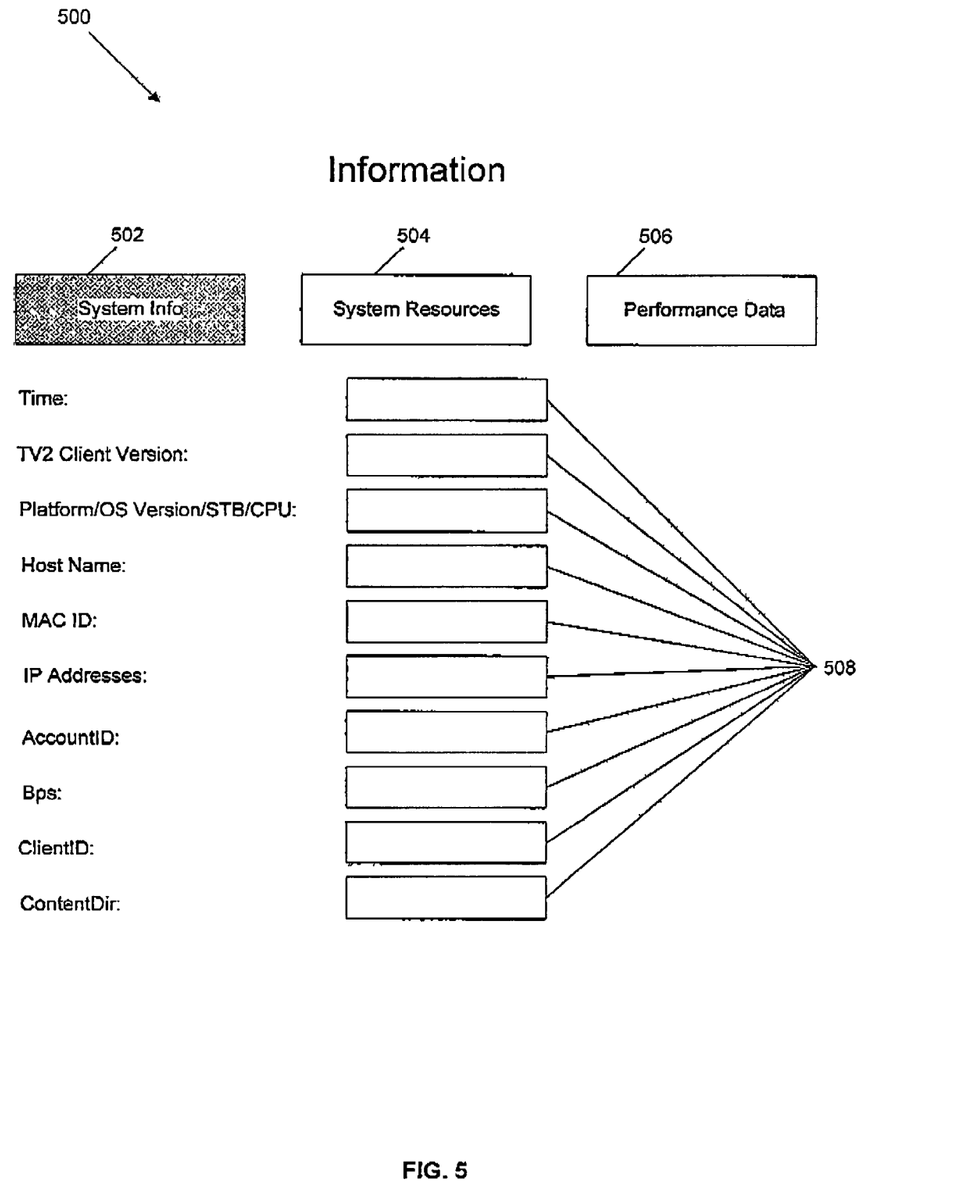
FIG. 5 is a diagram of a particular illustrative embodiment of a graphical user interface to indicate video content quality.

FIG. 5 is a diagram of a particular illustrative embodiment of a graphical user interface 500 to indicate video content quality. The graphical user interface 500 represents an illustrative embodiment of an information screen that displays various types of information related to a set-top box device. In an illustrative, non-limiting embodiment, the graphical user interface 500 may be an overlay of video content shown on a display device coupled to the set-top box device.

In an illustrative embodiment, graphical user interface 500 includes selectable indicators 502, 504, and 506. For example, the indicator 502 can be selected to display system information of the set-top box device on the graphical user interface 500. Further, the indicator 504 can be selected to display system resources information of the set-top box device on the graphical user interface 500. In addition, the indicator 506 can be selected to display performance data related to the set-top box device on the graphical user interface 500.

In an illustrative embodiment, the graphical user interface 500 may show that an indicator 502, 504, 506 has been selected by displaying the indicator in a different manner than the indicators that have not been selected. For example, the graphical user interface 500 shows that the indicator 502 has been selected by displaying the indicator 502 with different shading than the indicators 504 and 506. Once an indicator 502, 504, 506 has been selected, information related to the particular indicator is shown on the graphical user interface 500. For example, the graphical user interface 500 shows a plurality of windows 508 that are each associated with a respective system information element, such as time, TV2 client version, etc. Each window 508 may include information related to its respective system information element. In an illustrative, non-limiting embodiment, the graphical user interface 500 may include a default display that includes information related to one of the indicators 502, 504, 506, such as the system information elements related to the indicator 502.

Figure 6:
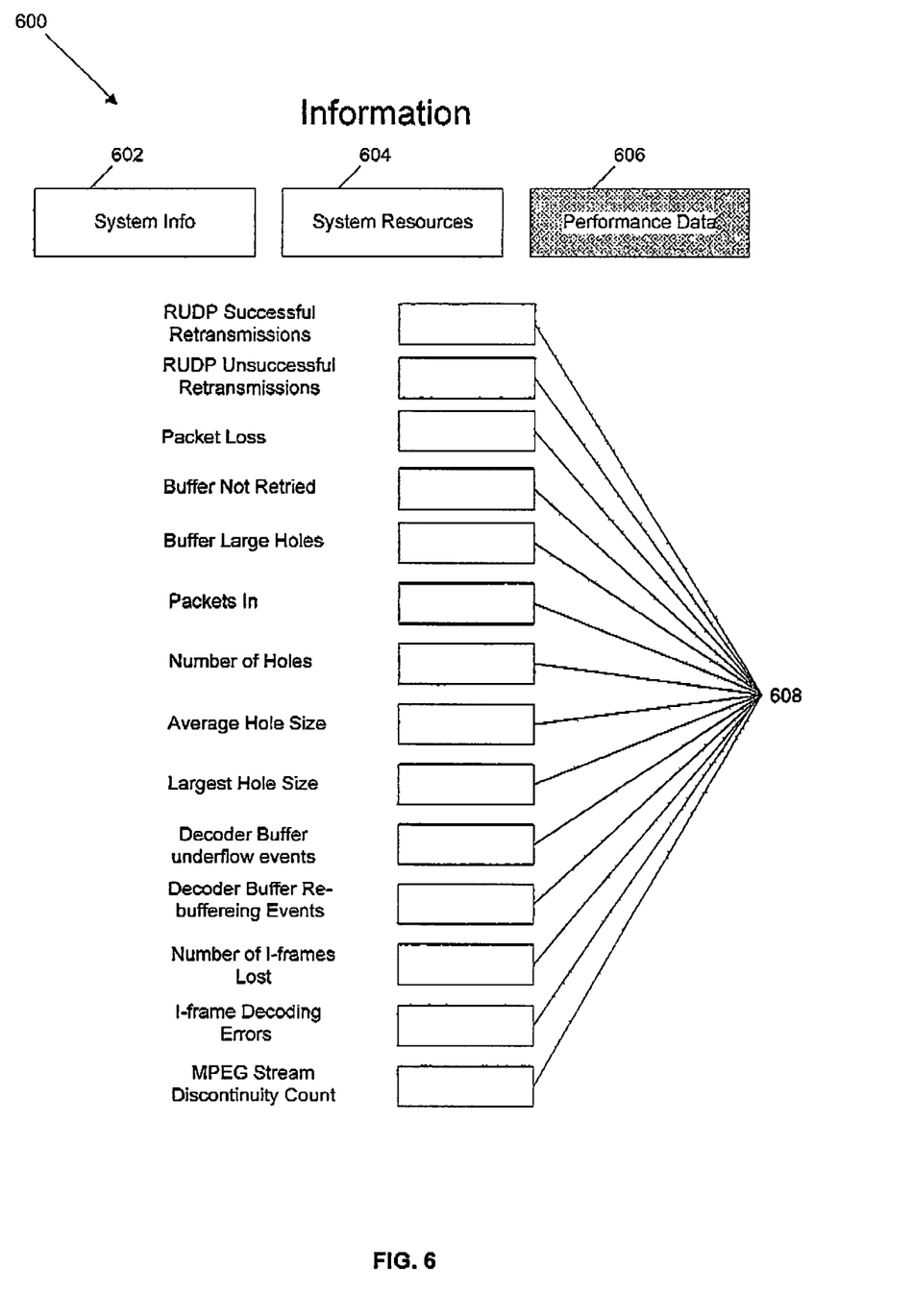
FIG. 6 is a diagram of a second particular illustrative embodiment of a graphical user interface to indicate video content quality.

FIG. 6 is a diagram of a second particular illustrative embodiment of a graphical user interface 600 to indicate video content quality. The graphical user interface 600 includes indicators 602, 604, 606. The graphical user interface 600 shows that the indicator 606 has been selected because the shading of the indicator 606 is different with respect to the indicators 602 and 604. The graphical user interface 600 is related to performance data associated with a set-top box device.

The graphical user interface 600 includes a plurality of windows 608 that are each associated with a respective Internet Protocol Television (IPTV) video content quality parameter, such as RUDP successful retransmissions, RUDP un-successful retransmission, packet loss, etc. For example, the windows 608 may show real-time values associated with their respective IPTV video content quality parameters or historical data collected over a specified period of time for their respective IPTV video content quality parameters. In an illustrative, non-limiting embodiment, the windows 608 may include only the values of the IPTV video content quality parameters that are outside of a specified range.

Figure 7:
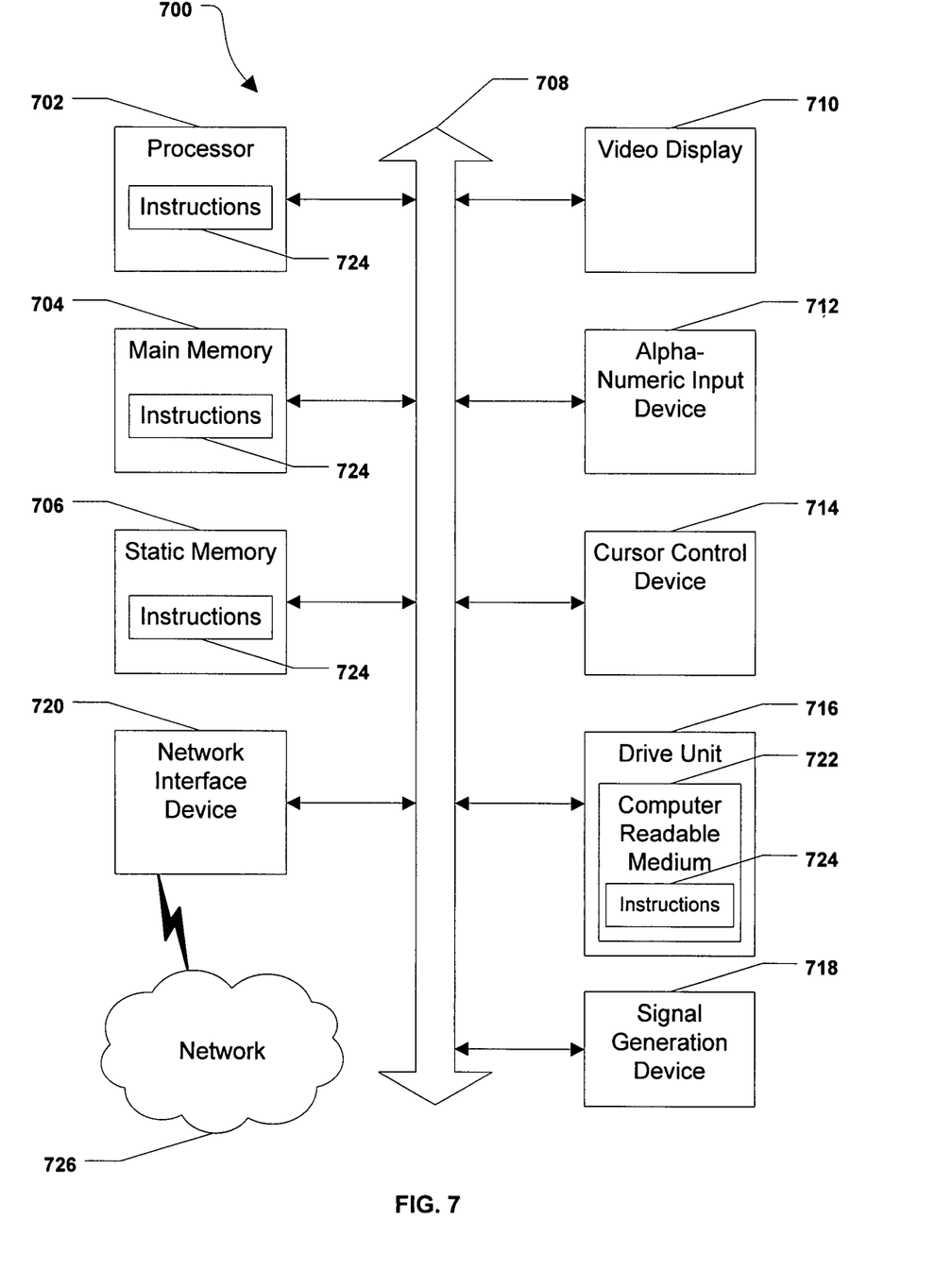
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a video content quality server or set-top box device, as shown in FIGS. 1-2.

In a networked deployment, the computer system may operate in the capacity of an IPTV server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent is provided to cariations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving, at a quality server, performance data corresponding to video quality parameters associated with a media device from the media device;
    storing, via the quality server, the performance data at a memory device associated with the quality server;
    generating, at the quality server, a first graphical user interface based on the performance data and a second graphical user interface based on the performance data, wherein the first graphical user interface includes a visual indicator of video content quality, and wherein the second graphical user interface includes an adjustable configuration setting corresponding to the media device;
    receiving, at the quality server, a request from the media device for data corresponding to the first graphical user interface; and
    in response to the request:
        sending the first graphical user interface to the media device; and
        sending the second graphical user interface to a device associated with a representative of a video content provider.

2. A system comprising:
    a processor; and
    a memory accessible to the processor, the memory including instructions executable by the processor to cause the processor to perform operations comprising:
        receiving performance data corresponding to video quality parameters associated with a media device from the media device;
        storing the performance data at the memory;
        generating a first graphical user interface based on the performance data and a second graphical user interface based on the performance data, wherein the first graphical user interface includes a visual indicator of video content quality, and wherein the second graphical user interface includes an adjustable configuration setting corresponding to the media device;
        receiving a request from the media device for data corresponding to the first graphical user interface; and
        sending the first graphical user interface to the media device in response to a first request that is received from the media device; and
        sending the second graphical user interface to a device associated with a representative of a video content provider.

3. A computer-readable memory storing processor-executable instructions that, when executed by a processor, cause the processor to perform operations comprising:
    receiving performance data corresponding to video quality parameters associated with a media device from the media device;
    storing the performance data at a memory device associated with the processor;

generating a first graphical user interface based on the performance data and a second graphical user interface based on the performance data, wherein the first graphical user interface includes a visual indicator of video content quality, and wherein the second graphical user interface includes an adjustable configuration setting corresponding to the media device;

receiving a request from the media device for data corresponding to the first graphical user interface; and sending the first graphical user interface to the media device in response to a first request that is received from the media device; and sending the second graphical user interface to a device associated with a representative of a video content provider.

4. The method of claim 1, further comprising determining the video content quality based on the performance data.

5. The method of claim 4, wherein the video content quality is determined on a periodic basis.

6. The method of claim 1, wherein the first graphical user interface further includes system information associated with the media device, and wherein the first graphical user interface further includes average values related to the performance data.

7. The method of claim 4, wherein the video content quality is determined in response to a request from the media device.

8. The method of claim 1, wherein the performance data corresponds to a first time period, the method further comprising receiving second performance data at the quality server from the media device, wherein the second performance data corresponds to a second time period.

9. The method of claim 8, wherein a duration of the second time period is determined based on the performance data.

10. The method of claim 8, wherein a duration of the second time period is determined based on whether a value of the performance data is within a range.

11. The method of claim 10, wherein the duration of the second time period is less than a duration of the first time period when the value is not within the range.

12. The method of claim 8, wherein a duration of the second time period is determined based on the video content quality.

13. The method of claim 8, further comprising determining a second video content quality based on the performance data and based on the second performance data.

14. The system of claim 2, wherein the operations further comprise determining the video content quality based on the performance data.

15. The system of claim 2, wherein the operations further comprise adjusting a video content quality parameter associated with the media device.

16. The system of claim 2, wherein the visual indicator has a value that is one of high, medium, and low.

17. The system of claim 2, wherein the first graphical user interface further includes a customer service request icon that is selectable to request customer service.

18. The system of claim 2, wherein the second graphical user interface further includes real-time performance data associated with the media device, historical performance data associated with the media device, or a combination thereof.

19. The system of claim 2, wherein the adjustable configuration setting enables adjustment of a video content quality parameter associated with the media device.

20. The system of claim 2, wherein the visual indicator is displayed as one of a pop-up window and a display icon.

21. The system of claim 2, wherein the first graphical user interface further includes real-time performance data associated with the media device.

22. The computer-readable memory of claim 3, wherein access to the second graphical user interface is conditioned on verification of login information received from the device, wherein the login information identifies the representative.

23. The computer-readable memory of claim 3, wherein the first graphical user interface includes first display characteristics corresponding to a set of video content quality parameters.

24. The computer-readable memory of claim 23, wherein the set of video content quality parameters includes reliable user datagram protocol successful transmissions, reliable user datagram protocol un-successful retransmissions, and packet loss.

25. The computer-readable memory of claim 23, wherein the first graphical user interface includes second display characteristics corresponding to a selectable set of the video content quality parameters.

26. The method of claim 1, wherein the first graphical user interface includes values corresponding to video content quality parameters in a particular order.

27. The method of claim 26, wherein a display color corresponding to a particular value is based on whether the particular value is within a range.

28. The method of claim 1, wherein the device is remote from the media device.

* * * * *